Sept. 8, 1959 W. P. WILLS 2,903,678

ELECTRICAL APPARATUS

Filed Dec. 16, 1953 2 Sheets-Sheet 1

INVENTOR.
WALTER P. WILLS
BY Arthur H. Swanson
ATTORNEY.

Sept. 8, 1959 W. P. WILLS 2,903,678

ELECTRICAL APPARATUS

Filed Dec. 16, 1953 2 Sheets-Sheet 2

*INVENTOR.*
WALTER P. WILLS
BY Arthur H. Swenson
ATTORNEY.

United States Patent Office 2,903,678

Patented Sept. 8, 1959

2,903,678

ELECTRICAL APPARATUS

Walter P. Wills, Philadelphia, Pa., assignor to Minneapolis-Honeywell Regulator Company, Minneapolis, Minn., a corporation of Delaware Application December 16, 1953, Serial No. 398,517

19 Claims. (Cl. 340—187)

The general object of the present invention is to provide improved inductance bridge circuit, telemetering apparatus. An early example of such apparatus is shown in the Harrison Patent 1,743,852 of January 14, 1930. The apparatus shown in that patent and modifications thereof have long been in extensive use.

The inductance bridge circuits of the prior art type have been limited in their use to transmission over relatively short distances. One of the limiting factors in such a circuit is the resistance of the leads interconnecting the transmitter and receiver, which resistance limits the current flow which is necessary to effect the power positioning of the receiver armature when there is an unbalance. The present invention contemplates the improvement of the sensitivity of the inductance bridge type circuit so as to enhance the response of the receiver to unbalances created at the transmitter.

A more specific object of the present invention is therefore to provide a simple and effective means for amplifying the control actions effected in the movement of the armatures in an inductance bridge circuit.

Another more specific object of the present invention is to provide an improved inductance bridge amplifier circuit which incorporates means for periodically varying the inductive effect of a portion of the bridge circuit so as to effect a corrective action on the receiving armature in a direction of balance.

Still another more specific object of the present invention is to provide means for injecting into the inductive bridge circuit an electrical signal which will be in a direction to cause an effective amplification of the action of the bridge circuit.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there has been illustrated and described preferred embodiments of the invention.

Figures 1, 3:
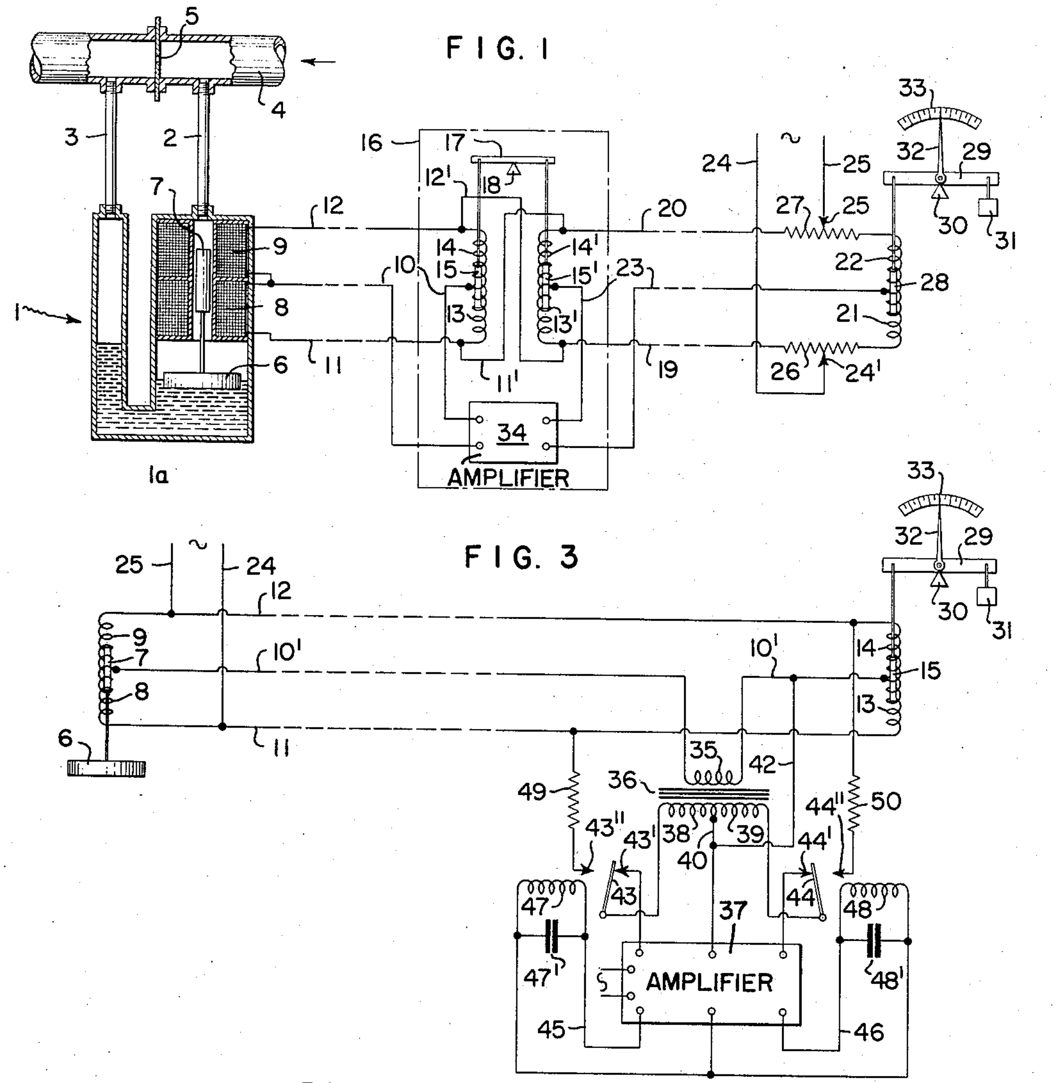
Fig. 1 is a diagram illustrating a power set flow meter including an inductance bridge, a relay or repeater including a second inductance bridge and an amplifier for increasing the power output of said second bridge.
Fig. 3 is an arrangement including power means for positioning a recording pen, which omits the repeater of Fig. 1, but includes other means for amplifying the power transmitter.

In the embodiment of the invention shown diagrammatically in Fig. 1, 1 designates a differential pressure device. The latter comprises a U-shaped chamber having its legs connected by pipes 2 and 3 to a conduit 4 at the inflow and outflow sides, respectively, of a transverse diaphragm 5 with a restricting orifice therein. Steam or other fluid passes through said orifice from the input to the output side of the diaphragm 5. A body 1*a* of mercury or other suitable liquid forms a seal between the lower ends of the legs of the device 1. A float 6 is supported by the liquid 1*a* in the leg of the flow meter casing 1 which has its upper end connected by the pipe 2 to the pipe 4. The float 6 has an uprising stem connected to the lower end of a magnetic core body or armature 7. The latter is within and axially movable in the central passage of aligned upper and lower solenoid coils 8 and 9, respectively. These coils together with the associated armature constitutes a transmitting unit.

The adjacent ends of the coils 8 and 9 are connected to one another, and to a conductor 10. The lower end terminal of the coil 8 is connected to one end of a conductor 11, and the upper end terminal of the coil 9 is connected to one end of a conductor 12. The second ends of the conductors 11 and 12 are connected to the upper and lower ends of an elongated receiver comprising lower and upper solenoid coils 13 and 14, respectively. The previously mentioned conductor 10 connects the adjacent ends of the coils 8 and 9 to the adjacent ends of the coils 13 and 14. Axially movable in the coils 13 and 14 is a magnetic core body or armature 15. These coils 13 and 14, together with the associated armature 15 constitutes a receiving unit. The electromagnetic interactions of the coils 8 and 9 and core body 7 with the coils 13 and 14 and core body 15 are such that up and down movements of the core body 7 causes down and up movement, respectively, of the core body 15. Insofar as already described, the apparatus shown in Fig. 1 does not differ significantly from apparatus shown in said Harrison Patent 1,743,852.

In accordance with the present invention, the receiver coil sections 13 and 14 are associated with similar coil sections 13′ and 14′ to form a booster or electromagnetic relay collectively designated 16. As shown, the upper end of the coil section 14 is connected by a conductor 12′ to the lower end of the coil 13′, and the lower end of the coil section 13 is connected by a conductor 11′ to the upper end of the coil section 14′. A magnetic core body 15′ axially movable in the coil sections 13′ and 14′, has its upper end connected to the upper end of the core body 15 by an equalizing bar or lever 17 pivoted intermediate its ends on a stationary fulcrum 18 so that an increase in the elevation of the float 6 and consequent up movement of the core body 7 will cause current flow in the coil sections 13 and 14 and in the coil sections 13′ and 14′ which will cause the lever 17 to turn counterclockwise about its fulcrum 18. The lower and upper ends of the coil sections 13′ and 14′ are connected by conductors 19 and 20, respectively, to the lower and upper ends of coil sections 21 and 22. A conductor 23 connects the connected ends of the coil sections 13′ and 14′ to the connected ends of the coil sections 21 and 22.

The Fig. 1 circuit including the coil sections 13′, 14′, 21 and 22 and their connecting conductors 19 and 20, is connected to a source of energizing current by conductors 24 and 25. The source of energizing current may be of any suitable form, such, for example, as the secondary winding of a transformer, or the output conductors of an electric generator. As shown in Fig. 1, the conductor 24 includes a wiper contact 24′ adjustable along a resistor 26 connected in series with the conductor 19, and the conductor 25 includes a wiper contact 25′ adjustable along a resistor 27 in series with the conductor 20. An electromagnetic core body 28 axially movable in the coil sections 21 and 22, has its upper end connected to one end of a lever 29 pivoted to turn about a fulcrum 30 and having its second end connected to a counter-weight 31. The lever 29 supports and oscillates an arm 32. The arm 32 may operate as a pen arm movable over a record strip, or, as shown, it may operate as an indicating pointer moving along a scale 33 in one direction or the other as the core 28 moves up and down. As will be apparent, an increase or decrease in the difference between the pressures at the opposite sides of the orifice plate 5, moves the cores 7 and 15 down and up, respectively, and thereby moves the core bodies 15' and 28 down and up, respectively. The conductors 10 and 23 form the input and output circuit conductors, respectively, of an electronic amplifier 34.

In the apparatus shown in Fig. 1, points of the resistors 26 and 27 are connected between the supply conductors 24 and 25 in series with the coils 21 and 22 and adjacent portions of the resistors 26 and 27. The relative amounts of current passing through the coils 21 and 22 may be varied by adjusting the wiper contacts 24' and 25' along the slide wire resistors 26 and 27. In a sense, the transmitter with its coils 8 and 9 and core body 7 is isolated by the repeater or relay device 16 from the ultimate receiver coils 21 and 22 and the core body 28. However, the circuit including the coils 8 and 9, the conductors 11 and 12, and the coils 13 and 14, are energized by current passing through the conductors 11' and 12' from the circuit including the coils 13', 14', 21 and 22. When the fluid flow in the pipe 4 varies, the differential between the pressures in the pipe 4 at opposite sides of the orifice 5, increases or decreases approximately in proportion to the square root of the change in velocity or rate of flow through the orifice 5. As the differential between the pressures in the pipes 2 and 3 increases and decreases, the float 6 falls and rises, and thereby produces a current flow through the conductor 10 which includes the input circuit of the amplifier 34.

The amplifier input current flow results in an output current in the conductor 23 of a magnitude depending on the magnitude of the current flow in the conductor 10. The phase of that current flow is the same as, or is displaced 180° from the phase of the current flowing through the supply conductors. With either phase relation, the potential of the connected ends of the coils 13' and 14' relative to the potential of the connected ends of the coils 21 and 22 will be varied, but the direction of variation will be dependent on said phase relation. The effect on the current flow through the conductor 23 of the relative potentials of the connected ends of the coils 13' and 14' and the connected ends of the coils 21 and 22, will vary as a result of the magnitude and instantaneous direction of change of the flow through the steam pipe 4. When the change in the rate of flow through the pipe 4 is in the direction to lower the float 6, the current flow through the coil 14 increases relative to the current flow through the coil 13 and the magnetic core 15 moves up and thus tilts the lever 17 in the clockwise direction, thereby lowering the core 15' and moving the core 28 upward. A decrease in the rate of flow through the pipe 4 lowers the cores 15 and 28, and raises the cores 7 and 15'.

In the operation of the apparatus shown in Fig. 1, unbalance between the transmitter 7 and repeater 16 results in a current flow through the input circuit of the amplifier 34 which has its output terminals 23 connected between the connected ends of the repeater coils 13' and 14' and the connected ends of the receiver coils 21 and 22. Thus, any small unbalance produced by a motion of the transmitter element 7 is amplified by the amplifier 34 and makes available increased power for adjusting the pen arm or pointer 32.

Figure 2:
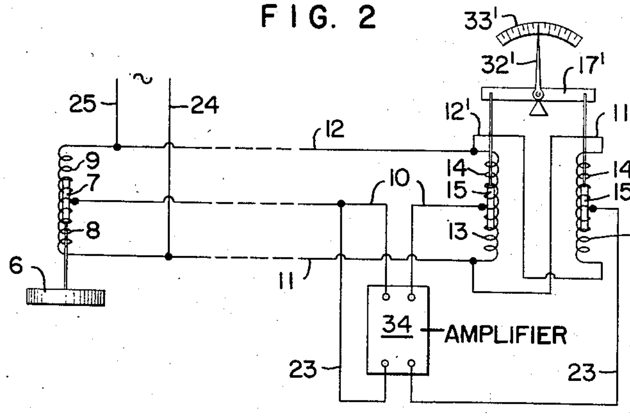
Fig. 2 is a diagram illustrating a modification of the apparatus shown in Fig. 1.

The embodiment of the invention shown in Fig. 2 differs from that shown in Fig. 1 by the omission of the repeater 16, coils 21 and 22, core 28, lever 29 and fulcrum 30 of Fig. 1. The Fig. 2 construction retains the coils 13' and 14', core 15' and conductors 11' and 12' of Fig. 1. In Fig. 2, the lever 17 supports and deflects an arm 32' along a scale 33', the supply conductors 24 and 25 are directly connected to the conductors 11 and 12, and the amplifier output conductor 23 has one end directly connected through a portion of the conductor 10 to the connected ends of the coils 8 and 9, and has its second end directly connected to the connected ends of the coils 13' and 14'. With the arrangement shown in Fig. 2, the effect of the amplifier on the lever 17 is to increase the deflection of the arm 17 effected in response to a given change in the level of the float 6.

The embodiment of the invention shown in Fig. 3 differs from the embodiment shown in Fig. 2 in the following main respects. In Fig. 3, the coils 13' and 14' and the core 15' are omitted; the lever 17' is replaced by the lever 29 and counter-weight 31; the conductor 10' replaces the conductor 10 and includes the primary winding 35 of a transformer 36; and the amplifier 34 of Fig. 1 is replaced in Fig. 3 by an amplifier 37 differing in form and its circuit connections from the amplifier 34. Supply conductors 24 and 25 are connected to the conductors 11 and 12 of Fig. 3, respectively, as they are in Fig. 2. On a change in elevation of the float 6 of Fig. 3, the transformer 36 and amplifier 37 operate automatically to apply a low resistance shunt across one or the other of the coils 13 and 14, depending on the direction of movement of the float 6. The secondary winding of the transformer 36 comprises two end-to-end sections 38 and 39 at opposite sides of a center tap connection 40. The latter has two branches 41 and 42. The branch 41 is connected to an input terminal of the amplifier 37 and the branch 42 is connected to the conductor 10'.

The outer end of the transformer winding section 38 is connected to a pivoted switch member 43, and the outer end of the section 39 is connected to a second pivoted switch member 44. The switch members 43 and 44 are biased for engagement with input terminals 43' and 44', respectively, of the amplifier 37. That amplifier has two output circuits, 45 and 46, neither of which is operatively energized in a balanced condition of the bridge circuit. In that condition there is no operative current flow through the conductor 10'. A change in the position of the float 6 results in a current flow through the conductor 10'. That flow will be in phase, or 180° out of phase, with the current in the supply conductors 24 and 25, accordingly as the resultant vertical movement of the float 6 is in one direction or in the opposite direction.

When there is an unbalance signal evidenced by a current flowing in the conductor 10', there will be a signal applied to the primary winding 35 of the transformer 36. As mentioned above, the phasing of that signal will be dependent upon the direction in which the element 7 is displaced in the coils 8 and 9. If the signal is of a first phase, the phasing of the input signal to the amplifier 37 by way of the secondaries 38 and 39 will cause one or the other of the output sections 45 or 46 to become energized. In other words, the relay coils 47 or 48 will be energized depending upon the phasing of the input signal on the primary 35. If the coil 47 is energized, the blade 43 moves out of engagement with contact 43' and into engagement with contact 43''. This will produce a shunting action across the coil section 13 by a circuit that may be traced from the lead 10' through conductor 42, winding section 38, blade 43, contact 43'', and resistor 49 to the lead 11. This will have the effect of reducing the current flowing through the receiving coil 13 and cause the current flow to be more effective in coil 14 to bring about a balance. This switching action will be momentary because the input circuit to the amplifier 37 was open circuited by the blade 43 being moved away from the blade 43. Thus, as long as the apparatus is unbalanced in a direction such as to cause the relay coil 47 to be energized by the amplifier 37, the relay coil will be periodically energized to effect the above mentioned short circuiting action. The providing of a series of pulses in the inductance bridge circuit in this manner will cause the armature 15 to be moved under circumstances where the signal would normally be too small to overcome static and other frictional loss in the apparatus.

If the apparatus should become unbalanced in the opposite direction, the amplifier 37 is effective to energize the relay coil 48. When this occurs, the blade 44 will move out of engagement with contact 44′ and into engagement with contact 44″. This will create a short circuit or shunting effect on the coil 14 of the receiver. This shunting circuit may be traced from the lead 12 through resistor 50, contact 44″, blade 44, winding 39 and lead 42 back to the center lead 10′. As with the unbalance in the opposite direction, the presently assumed unbalance will cause the amplifier 37 to periodically energize the relay coil 48 and therefore produce a periodic shunting of the coil section 14. Thus, the increased effectiveness of the coil 13 will tend to cause the armature 15 to be moved toward a balance position which balance position will correspond to the position of the armature 17 in the coils 8 and 9. When balanced, there will no longer be an input signal to the transformer 36 and there will be no effective current flowing in the lead 10′ so that the amplifier 37 will not act to create any unbalance in the bridge circuit.

Figures 4, 5, 6, 6A:
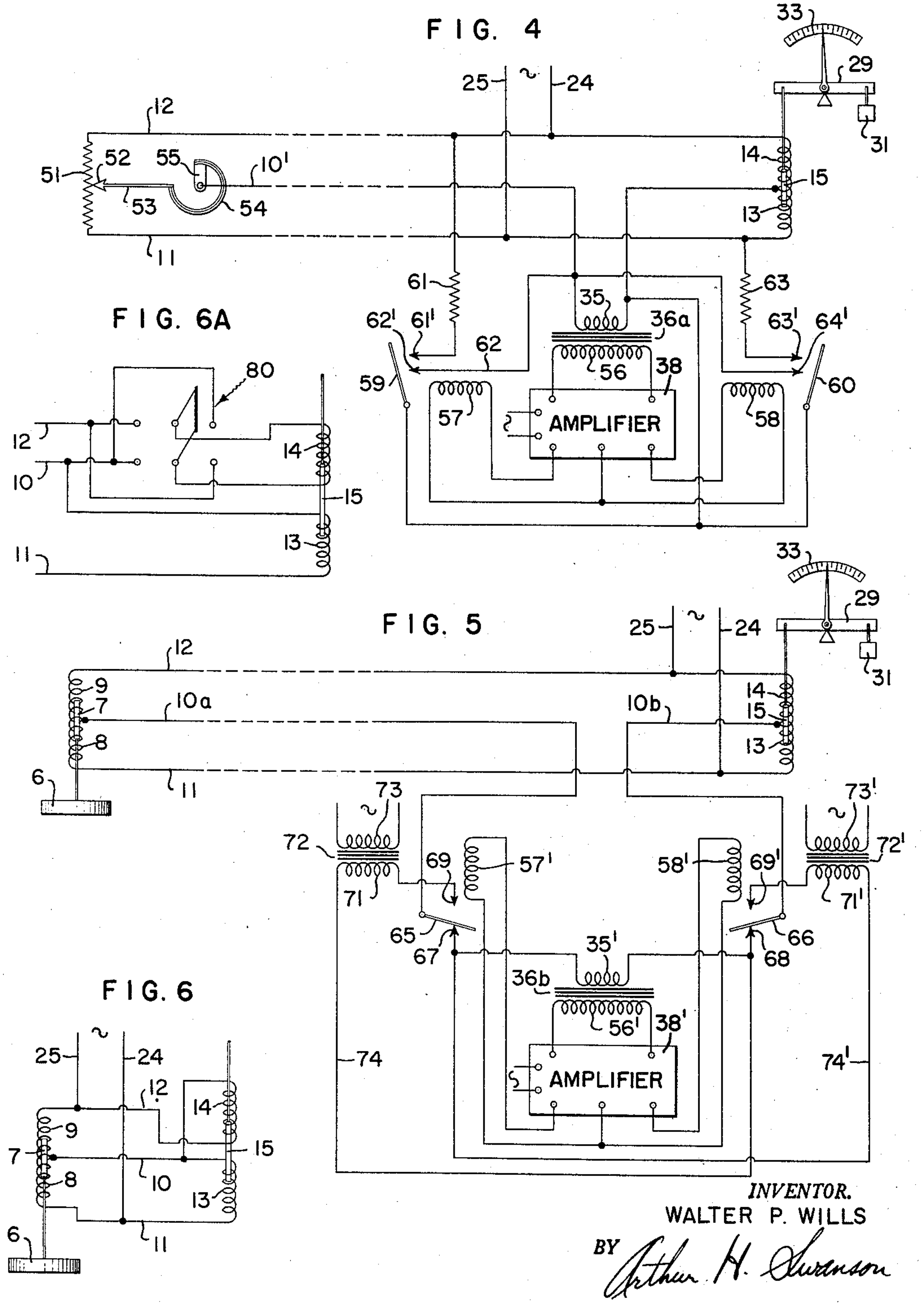
Figs. 4 and 5 illustrate different modifications of the apparatus shown in Fig. 3.
Fig. 6 and Fig. 6A are diagrammatic representations of a receiver circuit portion which may be adjusted to vary the output or receiver force change produced by a given change in the input or transmitter force.

Fig. 4 illustrates a modification of the apparatus shown in Fig. 3, in which the receiver coil sections 13 and 14 are separately shunted in the general manner illustrated in Fig. 3, but by a different mechanism, and in which the transmitter element of the inductance bridge circuit differs structurally from the transmitter element including the coils 8 and 9, of Fig. 3. In Fig. 4 the coils 8 and 9 are replaced by a slide wire resistor 51, and the conductor 10′ is operatively connected to a variable point along the length of the resistor 51 by an adjustable wiper contact 52. The latter is automatically adjusted along the resistor 51 in response to temperature changes. To this end the contact 52 is shown as connected by an arm 53 to one end of an arc shaped element 54. The latter may be a Bourdon tube or a bimetallic element having its second end connected to a normally stationary element 55. That element connects the element 54, and thereby the contact 52, to the end of the conductor 10′ remote from the receiver including the coil sections 13 and 14. The armature 15, vertically movable in the aligned coils 13 and 14, is connected to a lever 29 as in the construction shown in Fig. 3.

The amplifier 38 has two output circuits. One output circuit includes a switch actuating coil 57 and the other includes a switch actuating coil 58. Neither of the two output circuits is operatively energized when the bridge circuit is balanced and there is no significant current flow through the conductor 10′ and coil 35. On a change in the temperature to which the element 54 is subjected, the bridge circuit is unbalanced and current then flows through the conductor 10′. That current is in phase with the current flowing in the supply conductors 24 and 25, or is 180° out of phase with the last mentioned current depending on whether the change in the temperature of the element 54 is an increase or a decrease. Current flowing through the conductor 10′, energizes one or the other of two amplifier output circuits, respectively including switch actuating windings 57 and 58, accordingly as said current is in phase, or is 180° out of phase with the current flowing in the supply conductors.

When the phase of the current flowing through the conductor 10 is such as to energize the winding 57, the latter moves a switch member 59 into a position in which it establishes a low resistance shunt about the receiver coil 14. That shunt includes a resistor 61 of relatively low resistance, having one terminal connected to the conductor 12 and having its other terminal connected to a switch contact 61′. Said shunt also includes a conductor 62 connecting the conductor 10′ to a second switch contact 62′. The switch contacts 61′ and 62′, are connected by the switch member 59 when the winding 57 is energized. When the winding 58 is energized a switch member 60 closes a low resistance shunt across the coils 13. The last mentioned shunt includes a resistor 63 of relatively low resistance and having one end connected to the conductor 11 and having its other end connected to a switch contact 63′. The last mentioned shunt also includes a conductor 64 having one end connected to the conductor 10′ and having its other end connected to a switch contact 64′. The contacts 63′ and 64′ are so arranged as to be engaged and connected by the switch member 60 when the winding 68 is energized. Thus on a change in one direction in the temperature of the member 54, the winding 57 is energized and the current flow through the coil 13 is thereby reduced as a result of the operation of the amplifier 38. When the temperature to which the member 54 is subjected to changes in the opposite direction, the amplifier operates through the winding 58 to give a circuit closing adjustment to the switch member 60 and thereby establishes a low resistance shunt about the coil 13. In this form of the apparatus, the low resistance shunt will be connected with the circuit until a balance condition is reached in the bridge circuit.

The embodiment of the invention shown in Fig. 5 differs from that shown in Fig. 3 in the character of its provisions for modifying the current flow through the conductors employed to connect the connected ends of the coils 8 and 9 to the connected ends of the coils 13 and 14. In Fig. 5 the connected ends of the coils 8 and 9 are connected by a conductor 10*a* to a switch member 65, and the connected ends of the coils 13 and 14 are connected by a conductor 10*b* to a switch member 66. In the balanced condition of the apparatus the switch members 65 and 66 are each biased for engagement with switch contacts 67 and 68, respectively. Those contacts are permanently connected through primary winding 35′ of a transformer 36*b*. The transformer 36*b* has its secondary winding 56′ connected to the input terminals of an amplifier 38′ which may be the same as the amplifier 38 of Fig. 4.

The amplifier 38′ of Fig. 5 is arranged to energize a relay winding 57′ when current of one phase passes through the conductors 10*a* and 10*b* and winding 35′, and to energize a relay winding 58′ on a 180° change in the phase of the current passing through the conductors 10*a* and 10*b* and winding 35′. The energization of the winding 57′ moves the switch member 65 out of engagement with the contact 67 and into engagement with a contact 69. The engagement of the contact 65 with the contact 69 connects the conductor 10*a* to one terminal of the secondary winding 71 of a transformer 72, having a primary winding 73, the latter being connected to a source of power corresponding to the source to which leads 24 and 25 are connected. The second terminal of the winding 71 is connected by a conductor 74 to the contact 68 then engaged by the switch member 66 and thus connects the conductor 10*a* to the conductor 10*b*. The winding 71 then creates a potential difference between the conductors 10*a* and 10*b*. This potential difference is of such polarity as to cause a further current flow to flow in the bridge circuit and simulate an error signal larger than that actually present. This will cause the armature 15 to move to a balance position much more readily than without this booster action being present. As with Fig. 3, the input to the amplifier is opened when relay coil 57′ is energized and this will cause the relay to be deenergized. Thus, a series of corrective pulses will be effective to cause armature 15 to move to a balance position.

Conversely the energization of the coil 58′ shifts the switch members 66 out of engagement with the contact 68 and into engagement with the contact 69′. The engagement of the contact 66 with the contact 69′ connects the conductor 10b to the conductor 10a through the secondary winding 71' of a transformer 72' which has a primary winding 73', the latter also connected to the common A.C. source. On the engagement of the switch member 66 with the contact 69' the winding 71' creates a potential difference between the conductors 10b and 10a. As with the energization of coil 57', a series of error correcting pulses will be induced into the circuit between leads 10a and 10b and the armature 15 will be moved into a balanced position.

In another modification of my inveniton, the motion given to the receiver by a given change in the current flow through the transmitter is modified by a reversal in the coil connections which modify the mutual inductance between a pair of end-to-end coils. One such modification in the coil connections is shown by way of example in Fig. 6. In Figure 6 transmitter coils 8 and 9 are connected to receiver coils 13 and 14 as shown in Fig. 1 except that the amplifier 34 of Fig. 1 is not connected into the conductor 10, and the upper and lower ends of the coil 14 are connected to the conductors 10 and 12, respectively. The effect of thus reversing the connections to the receiver coil 14 is to subtract the mutual inductance between the coils 13 and 14 from the total inductance of those coils, instead of adding the mutual inductance to the total inductance of the coils as is done with each of the arrangements shown in Figs. 1 to 5.

The operative effect of the reversal of the connections to the coil 14 is to change the ratio of output to input movement. By way of illustration and example, the reversal of the usual connections to one of the receiver coils of a well known commercial inductance bridge circuit resulted in a receiver core movement of 1.3 inches on a transmitter core movement of $\frac{9}{10}$ of an inch, whereas with said commercial circuit in its customary condition, a transmitter core movement of 1.2 inches produced a receiver armature movement of only 1.28 inches. It will thus be apparent that an amplifying effect may be achieved by this reversal of the connections on coil 14.

With an alternative modification in which the connections to one of the transmitter coils are reversed, a change may be effected in the relative movements of the transmitter and receiver which is the reverse of that obtained in the above described operation of the apparatus shown in Fig. 6. For example, if the coils 13 and 14 shown in Fig. 6 are used as transmitter coils, and the coils 8 and 9 are used as receiver coils, the motion of the armature 7 in the assumed receiver coils 8 and 9 relative to the given movement of the armature 15 in the coils 13 and 14 will be reduced.

Further, a lead reversing switch may be used in the apparatus of Fig. 6 to effect straight or amplified action as the operator deems necessary. Such is shown in Fig. 6A where there is a lead reversing switch 80 added to the basic bridge circuit. This reversing switch may be manually or automatically operated. If automatically operated, it may be operated by an amplifier sensing unbalance in the center lead of the bridge circuit, said amplifier positioning the switch in its amplifying position upon an unbalance with the switch blades moved to the right hand position, as shown in the drawing, to reverse leads 10 and 12 from their normal connection.

While, in accordance with the provisions of the statutes, there has been illustrated and described the best forms of embodiment of the invention now known, it will be apparent to those skilled in the art that changes may be made in the forms of the apparatus disclosed without departing from the spirit of the invention as set forth in the appended claims and that in some cases certain features of the invention may be used to advantage without a corresponding use of other features.

Having now described my invention, what I claim as new and desire to secure by Letters Patent is:

1. A telemetering inductance bridge circuit means comprising in combination a transmitter unit and a receiver unit each including a pair of end-to-end coils with their adjacent ends in inductive relation with one another and a separate armature movable axially of the coils of each unit, control means operative to axially adjust the armature of the transmitter unit in accordance with changes in a control condition, each of said coils having one end connected to one end of the other coil of the same unit and having its second end connected to one end of a coil of the other unit, and augmentation means having an input directly connected between the junction of the two coils of each unit constituting said bridge circuit means independently of the armature of either of said units so that an amplified effect will be created on the armature of one of said units when there is a given axial adjustment of the other of said armatures.

2. A circuit as specified in claim 1, in which the augmentation means connected to said bridge circuit comprises amplifier means for adjusting the relative current flows in said circuit when there is an unbalance condition in said circuit.

3. A circuit as specified in claim 1, in which the augmentation means connected to said bridge circuit includes leads which reversely energize one of the coils of one of said units with respect to the energization of the corresponding coil of the other of said units.

4. A telemetering inductance bridge circuit comprising in combination, a transmitter unit and a receiver unit each including a pair of end-to-end coils connected in series with one another and having their adjacent ends in inductive relation with one another and a separate armature movable axially of the coils of each unit, a conductor connecting one end of each coil of one unit to one end of each coil of the other unit, a pair of conductors separately connecting the other ends of the coils of each unit to the other ends of the coils of the other unit, and augmenting means connected to said bridge circuit between said transmitting unit and said receiving unit for augmenting bridge unbalance signals in said first mentioned conductor in response to an adjustment of the armature of one of said units, said augmentation means being operative independently of the position of either of said armatures.

5. A circuit as specified in claim 4, in which said augmenting means comprises a repeater circuit including transmitter and receiver units comprising end-to-end coils, coil connections and armatures respectively similar to the end-to-end coils, coil connections and armatures of the circuit specified in claim 4.

6. A circuit as specified in claim 4, in which said augmenting means comprises a repeater circuit including transmitter and receiver units comprising end-to-end coils, coil connections and armatures respectively analogous to the end-to-end coils, coil connections and armatures of the circuit specified in claim 4, and means for amplifying the unbalance condition between the transmitter unit and the receiver unit of the repeater and inducing in the circuit between said receiver unit and the transmitter of said repeater a signal of amplified magnitude for increasing the movement of the armature of said receiver unit relative to the movement of the armature of the transmitter element of said repeater.

7. A circuit as specified in claim 4, including a second transmitter unit and a second receiver unit, each of the last mentioned units including end-to-end coils, coil connections and armatures respectively similar to the coils, coil connections and armatures of the first mentioned transmitter and receiver units, and a mechanical connection between the armature of the second receiver unit and the armature of the second transmitter unit arranged to give the second transmitter movements proportional to the movements of the second receiver unit, said second receiver unit and said second transmitter constituting a repeater stage interposed and connected between said first mentioned transmitter and said first mentioned receiver.

8. A circuit as specified in claim 4, including a second receiver unit, said last mentioned unit including end-to-end coils, coil connections and armature respectively similar to the coils, coil connections and armatures of the first mentioned transmitter and receiver units, a mechanical connection between and effecting proportional movements of the armature of the second receiver unit and the armature of the first mentioned receiver unit, means providing a measure of the axial movement of the armature of the second receiver unit, and an electronic amplifier connected to amplify said bridge unbalance signals for application to the common point of connection of the end-to-end coils of said second receiver unit.

9. A telemetering inductance bridge circuit comprising in combination, a transmitter unit and a receiver unit each of which includes a pair of end-to-end coils connected in series with one another and having their adjacent ends in inductive relation with one another, a separate armature movable axially of the coils of each unit, a first conductor connecting the adjacent ends of the two coils of each unit to the adjacent ends of the two coils of the other unit, separate conductors connecting the remote ends of the transmitter unit coils to the remote ends of the receiver unit coils, an amplifier having an input circuit connected between the portions of said first conductor and having an output circuit, and means including said output circuit for supplying directly to said bridge circuit and independently of either of said armatures an apparent amplified unbalance signal to enhance the movement of the receiver armature relative to the movement of the transmitter armature on a change in the position of the latter.

10. A claim as specified in claim 9, including means in addition to said armatures for creating an alternating current flow through the said first conductor of one phase or of the opposite phase on an axial movement of the transmitter armature in one direction or in the opposite direction.

11. A circuit as specified in claim 9, including a third pair of coils connected end-to-end with the remote ends of the last mentioned coils respectively connected to the remote ends of the receiver coils, and in which the amplifier output circuit has one terminal connected to said first conductor and has its other output terminal connected to the connected ends of the third pair of coils, and including a third armature movable axially of the last mentioned coils, and a mechanical connection between said third armature and the receiver armature giving said third armature movements proportional to the movements of the receiver armature.

12. A telemetering inductance bridge circuit including a transmitter unit and a receiver unit, said transmitter unit comprising an elongated resistor and said receiver unit including end-to-end coils each with one end connected to one end of the other, and having their adjacent ends in inductive relation with one another, a first conductor connecting an intermediate point of said resistor to the connected ends of said coils, second and third conductors connecting the ends of said resistor each to an end of a different one of said coils, means connecting said resistor across a source of alternating current, means responsive to a control condition for varying the relative potentials across the sections of said resistor at opposite sides of its connection to said first conductor for unbalancing said bridge circuit to produce an unbalance signal in said first conductor, in a control condition, and augmenting means connected to said bridge circuit between said transmitting unit and said receiving unit for effectively augmenting said unbalance signal to produce potential drops in said coils relative to one another corresponding to a given change in the potential drops across said sections, said augmenting means being operative independently of the position of said unbalancing means.

13. A bridge circuit as specified in claim 12, in which the augmenting means comprises an amplifier having an input circuit and two output circuits, means adapted to connect said input circuit in said first conductor, and means for connecting one of said output circuits between said first conductor and said second conductor, and means operable to connect one of said output circuits between said first and second conductors or to connect the other of said output circuits between said first and third conductors accordingly as the current flow through said first conductor is in phase with, or is 180° out of phase with said alternating current.

14. A circuit as specified in claim 12, in which said resistor is a slide wire and said circuit includes a wiper contact connected to said resistor and including automatic means for adjusting said wiper contact along said slide wire in response to changes in a control condition.

15. A telemetering bridge circuit comprising in combination, a transmitter unit and a receiver unit each of which includes an elongated impedance, first conductor means connecting an intermediate point of each impedance to an intermediate point of the other impedance, second and third conductors respectively connecting the ends of the transmitter impedance to the ends of the receiver impedance, means for connecting a source of alternating current between said second and third conductors, means responsive to a control condition for unbalancing said bridge circuit to produce an unbalance signal in said first conductor, and means connected to said bridge circuit between said transmitting unit and said receiving unit for effectively augmenting said unbalance signal as applied to said receiving unit, said augmentation means being operative independently of the position of said unbalancing means.

16. A telemetering circuit including a three lead inductance receiver unit having a power positioned armature, two of said leads being connected to the ends of said inductance and the third lead being connected to the center of said inductance unit, means responsive to an unbalance condition in the center lead, and means including said last named means operative independently of change in position of said power positioned armature and connected directly to affect the electrical energization of either of the sections of said inductance on either side of said center lead depending upon the direction of the unbalance.

17. Apparatus as defined in claim 16 wherein said responsive means is periodically operative.

18. An electrical telemetering apparatus comprising in combination, a three wire alternating current transmitter, an inductance receiver comprising an inductance coil and a power positioned armature, said inductance coil having three leads with two of the leads connected to the ends of the inductance coil and the third lead connected to the center thereof, said leads being adapted for connection to the three leads from said transmitter, means responsive to an unbalance condition in said center lead, and means including said last named means connecting directly into said center lead a signal which adds to an unbalance signal present in said center lead so as to effectively amplify the unbalance condition effecting the positioning of said armature.

19. Apparatus as defined in claim 18 wherein said responsive means is periodically operative.

References Cited in the file of this patent

UNITED STATES PATENTS

| | | |
|---|---|---|
| 2,349,963 | Harrison | May 30, 1944 |
| 2,406,221 | Hornfeck | Aug. 20, 1946 |
| 2,503,868 | Gaumer et al. | Apr. 11, 1950 |
| 2,551,585 | Curran | May 8, 1951 |
| 2,568,587 | Macgeorge | Sept. 18, 1951 |
| 2,630,559 | Whittier | Mar. 3, 1953 |
| 2,662,223 | Brewer | Dec. 8, 1953 |